United States Patent
Deshpande et al.

(10) Patent No.: US 8,677,049 B2
(45) Date of Patent: Mar. 18, 2014

(54) REGION PREFETCHER AND METHODS THEREOF

(75) Inventors: Mahadev S. Deshpande, Fort Collins, CO (US); Ronny L. Arnold, Fort Collins, CO (US); Josef A. Dvorak, Fort Collins, CO (US); Paul L. Rogers, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 483 days.

(21) Appl. No.: 12/422,467

(22) Filed: Apr. 13, 2009

(65) Prior Publication Data
US 2010/0262750 A1   Oct. 14, 2010

(51) Int. Cl.
*G06F 12/08* (2006.01)
*G06F 12/00* (2006.01)
(52) U.S. Cl.
USPC .... 711/3; 711/211; 711/E12.001; 711/E12.08
(58) Field of Classification Search
None
See application file for complete search history.

(56) References Cited

U.S. PATENT DOCUMENTS

| | | | |
|---|---|---|---|
| 7,836,259 B1* | 11/2010 | Filippo et al. | 711/137 |
| 2007/0288697 A1* | 12/2007 | Keltcher | 711/137 |
| 2010/0250842 A1* | 9/2010 | Deshpande et al. | 711/108 |

* cited by examiner

*Primary Examiner* — Denise Tran

(57) ABSTRACT

A prefetch device and method are disclosed that determines from which addresses to speculatively fetch data based on information collected regarding previous cache-miss addresses. A historical record showing a propensity to experience cache-misses at a particular address-offset from a prior cache-miss address within a region of memory provides an indication that data needed by future instructions has an increased likelihood to be located at a similar offset from a current cache-miss address. The prefetch device disclosed herein maintains a record of the relationship between a cache-miss address and subsequent cache-miss addresses for the most recent sixty-four unique data manipulation instructions that resulted in a cache-miss. The record includes a weighted confidence value indicative of how many cache-misses previously occurred at each of a selection of offsets from a particular cache-miss address.

4 Claims, 3 Drawing Sheets

REGION PREFETCHER AND METHODS THEREOF

BACKGROUND

1. Field of the Disclosure

The present disclosure relates generally to electronic devices, and more particularly to data processing devices.

2. Description of the Related Art

Data processing devices such as microprocessors frequently operate at a considerably higher speed than associated external memory devices that store data. Speculatively accessing data from the external memory before the data is needed is referred to as prefetching. Prefetching data can improve the computational performance of a data processing device. The data processing device prefetches data from the external memory and stores the data at one or more data cache memories, which operate at greater speed than the external memory. Prefetching of data typically is based on heuristic information identified during previous memory requests. The data processing device can include a prefetch module, which uses the huerisitic information to speculatively prefetch data that the prefetch module has determined has a greater chance of being subsequently required.

The locations in the external memory where particular data is stored can depend on how the data is stored in a data structure such as a hash table. One type of data prefetching is stride prefetching. A pattern of sequential or quasi-sequential data accesses is observed, and data is prefetched in a manner consistent with the observed stride pattern. Another type of data prefetching is region prefetching. Region prefetching is based on observing previous memory accesses to addresses within a given region. The prefetch module analyzes the previous accesses in order to predict future behavior. Such analysis can require that a significant number of mathematical operations be performed in parallel, increasing product cost.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A prefetch device and method are disclosed that determines from which addresses to speculatively fetch data based on information collected regarding previous cache-miss addresses. A historical record showing a propensity to experience cache-misses at a particular address-offset from a prior cache-miss address within a region of memory provides an indication that data needed by future instructions has an increased likelihood to be located at a similar offset from a current cache-miss address. The prefetch device disclosed herein maintains a record of the relationship between a cache-miss address and subsequent cache-miss addresses for the most recent sixty-four unique data manipulation instructions that resulted in a cache-miss. The record includes a weighted confidence value indicative of how many cache-misses previously occurred at each of a selection of offsets from a particular cache-miss address.

Figure 1:
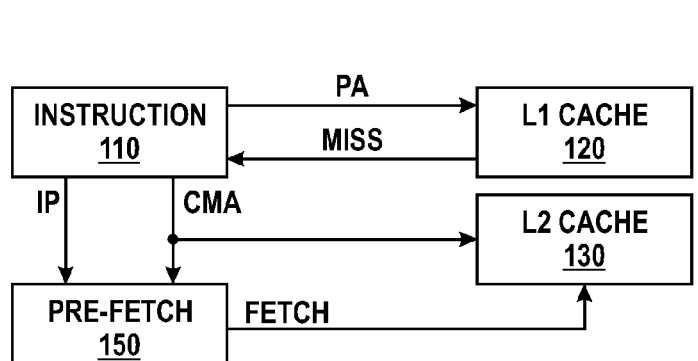
FIG. 1 is a block diagram illustrating a data processing device in accordance with a specific embodiment of the present disclosure.

FIG. 1 is a block diagram illustrating a data processing device 100 in accordance with a specific embodiment of the present disclosure. Data processing device 100 includes an instruction module 110, an L1 cache memory 120, an L2 cache memory 130, and a prefetch module 150. Instruction module 110 has an output to provide a signal labeled "PA" to L1 cache memory 120, an input to receive a signal labeled "MISS" from L1 cache memory 120, an output to provide a signal labeled "IP" to prefetch module 150, and an output to provide a signal labeled "CMA" to L2 cache memory 130 and prefetch module 150. Prefetch module 150 has an output to provide a signal labeled "FETCH" to L2 cache memory 130.

Instruction module 110 represents a portion of an execution unit included at data processing device 100. Instruction module 110 is configured to include an instruction that is currently being executed by the data processing device. If the instruction is a data manipulation instruction, the required data must be first located and retrieved. Instruction module 110 first attempts to retrieve the required data from L1 cache 120 by providing L1 cache memory 120 with the physical address (PA) of the required data. If the required data is available at L1 cache memory 120, L1 cache memory 120 responds by providing the requested data to an execution unit (not shown) for processing. If the required data is not located in L1 cache memory 120, L1 cache memory 120 responds by asserting signal MISS. In response to the assertion of signal MISS, instruction module 110 forwards the same physical address, now referred to as a cache-miss address (CMA), to L2 cache memory 130 to determine if the required data is present at L2 cache memory 130. Instruction module 110 also provides the CMA to prefetch module 150. Prefetch module 150 uses the CMA to determine the addresses of data that should be prefetched from L2 cache memory 130. Prefetch module 150 stores the prefetched data at L1 cache memory 120.

The process of determining which addresses to speculatively access from L2 cache memory 130 is known as prefetch training. Prefetch module 150 may use a variety of strategies to attempt to predict data that is likely to be subsequently requested by instruction module 110. For example, if recent history suggests that data contained at sequential addresses has been processed, a stride approach may yield preferred results, and prefetch module 150 can fetch data located at further sequential addresses. If however a stride cannot be identified, another prediction technique, such as region prediction may be used. For example, if the addresses corresponding to a significant number of recently requested data are associated with the same region of memory, it may be considered likely that subsequent requests for data may also correspond to that region of memory. Prefetch module 150 maintains a historical record of recent data manipulation instructions and CMAs. Signal IP identifies the data manipulation instruction corresponding to the current CMA.

Prefetch module 150 is configured to speculatively acquire data from L2 cache memory 130 and store the data into L1 cache memory 120 before that data is needed by a subsequent data manipulation instruction. Prefetch module 150 determines which addresses to prefetch based on previous cache-miss addresses that are located within a common region of physical addresses and an offset between these addresses. The offset between cache-miss addresses is expressed as a number of cache lines. In one embodiment, a region of physical addresses is one kilobyte in size and is associated with data stored at sixteen cache lines at L2 cache memory 130. For example, a one kilobyte region associated with a CMA is the CMA +/−512 bytes, or +/−8 cache lines.

A region of memory addresses where a CMA is centered within the region is referred to as a floating region corresponding to that CMA. In order to determine which of the sixty-four previous CMAs, if any, are located within a region bounded by the current CMA +/−512 bytes, all sixty-four previous CMA entries would need to be compared to the current CMA. This could be accomplished using sixty-four arithmetic subtract modules where each subtract module is associated with a corresponding register containing a previous CMA. A hybrid region technique is used herein that approximates the behavior of a floating region but can be implemented using a content addressable memory (CAM), which can be implemented using significantly fewer logic devices than required to implement floating regions. In particular, the CAM compares a region defined by the cache-miss address to the respective regions of previous miss addresses stored at the CAM. A hybrid region includes two contiguous sub-regions. The first of the two sub-regions is the range that includes the CMA. The second sub-region is selected from one of the two regions adjacent to the first range. The sub-region to the left (higher addresses) is selected if the CMA is located in the upper (left) half of the first sub-region, and the sub-region to the right (lower addresses) is selected if the CMA is located in the lower (right) half of the first 512-byte region. For example, if address Z is located in the upper (left) half of a 512-byte region bounded by address B and address I, and a second 512-byte region is in the range bounded by address H and address B. A combined 1 kilobyte hybrid region corresponding to is therefore the range bounded by address H and address I. The hybrid region, which is represented by the base addresses I and B, is stored in at the CAM to represent the CMA hybrid region. The use of hybrid regions permits the use of a CAM to efficiently compare the current CMA to the prior CMAs instead of using a large number of subtract modules. Unlike standard computer random access memory (RAM) in which the user supplies a memory address and the RAM returns the data word stored at that address, a CAM is designed such that the user supplies a data word (key) and the CAM searches its entire memory to see if that data word is stored anywhere within the memory. If the data word is stored in the CAM, the CAM returns an indication of storage addresses where the data word is located. The hybrid region corresponding to each prior CMA is stored at the CAM 140, and the current CMA is used as a key. Any entry in the CAM that specifies a hybrid region that includes the current CMA results in the assertion of a respective bit of output signal REGION MATCH. Therefore, a CAM can provide the desired functionality of comparing the current CMA to the hybrid regions corresponding to each of sixty-four prior CMAs.

Figure 2:
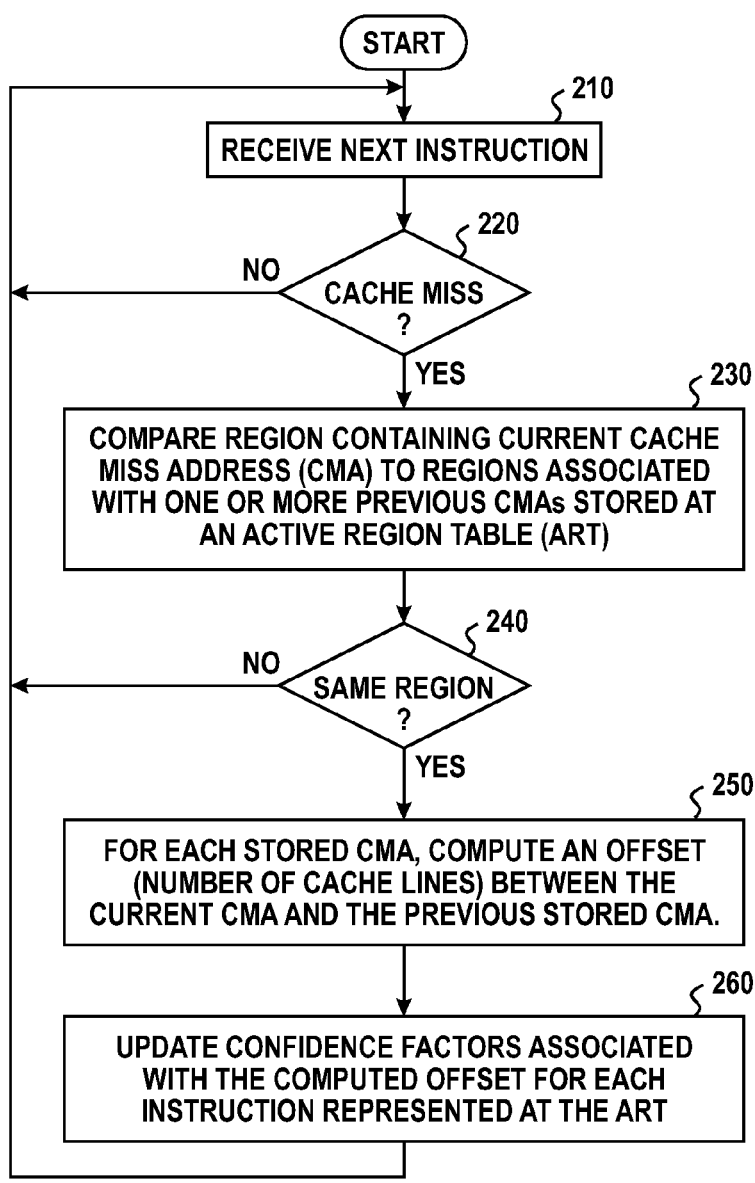
FIG. 2 is a flow diagram illustrating a method in accordance with a specific embodiment of the present disclosure.

FIG. 2 is a flow diagram illustrating a method 200 in accordance with a specific embodiment of the present disclosure. Method 200 begins at block 210 where an instruction is received at instruction module 110. The instruction is a data-manipulation instruction and therefore an attempt to fetch the required data from L1 cache memory 120 is initiated. At decision block 220, a determination is made as to whether the fetch was successful and the needed data was found at L1 cache memory 120. If the fetch was unsuccessful as indicated by a cache-miss, the flow proceeds to block 230. If the fetch was successful, the flow returns to block 210 where another instruction is received at instruction module 110.

At block 230, the region that includes the current CMA is compared to regions associated with one or more previous CMAs stored at an active region table. The active region table maintains a record for each of sixty-four instructions that have most recently experienced a cache-miss. The record is indicative of the number of cache-misses that have occurred at each cache line within each region associated with the sixty-four instructions. The stored record thus provides a confidence factor indicative of how frequently cache-misses at cache lines offset from each instruction's CMA have occurred. The flow proceeds to decision block 240. If a previous CMA is located in the same region as the current CMA, the flow proceeds to block 250, otherwise, the flow returns to block 210 where a new instruction is received at instruction module 110. At block 250, an offset representing a number of cache lines between the current CMA and the previous CMA is computed. The flow proceeds to block 260 where the confidence factors associated with the computed offset for each instruction represented at the active region table is updated. The flow returns to block 210 where a new instruction can be received at instruction module 110.

Prefetch module 150 uses the information stored at the active region table and optionally other heuristics to determine the address of data that can be speculatively accessed from L1 cache memory 120. The determination of which addresses to prefetch is based in part on how frequently cache-misses have occurred at a particular offset from the CMA associated with each stored instruction. The active region table is implemented using a match array and a sparse matrix, which are described in detail with reference to FIGS. 3 and 4.

Figure 3:
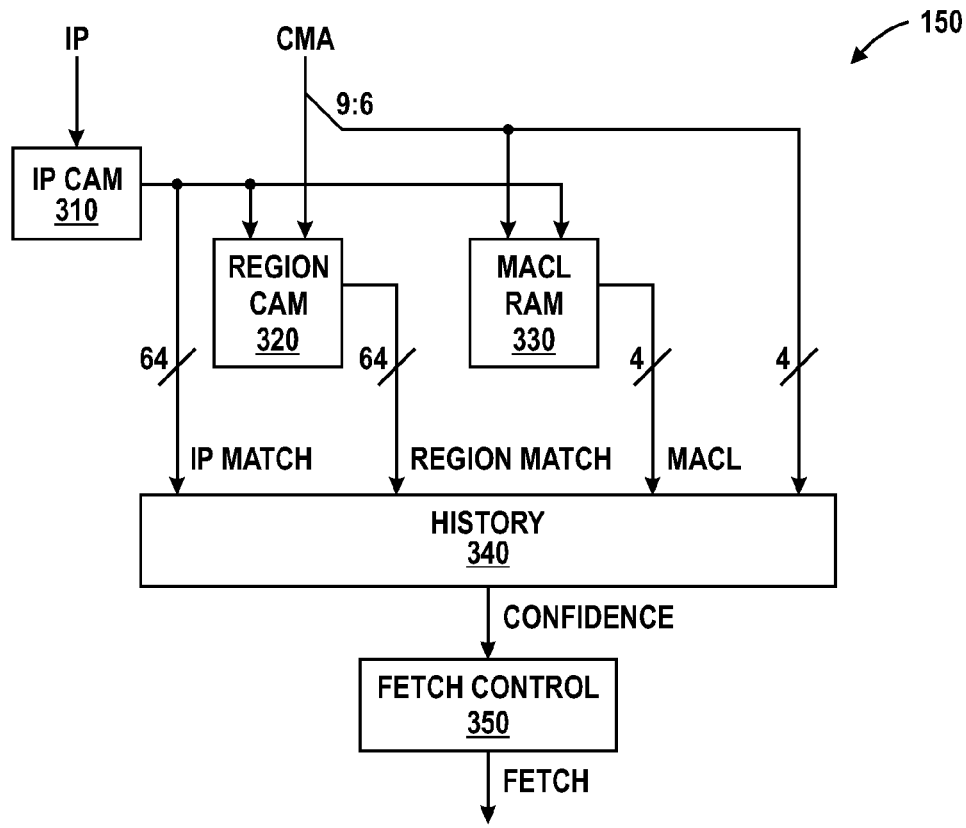
FIG. 3 is a block diagram illustrating the prefetch module of FIG. 1 in accordance with a specific embodiment of the present disclosure.

FIG. 3 is a block diagram illustrating the prefetch module 150 of FIG. 1 in accordance with a specific embodiment of the present disclosure. Prefetch module 150 includes an IP CAM 310, a region CAM 320, a MACL RAM 330, a history module 340, and a fetch control module 350. IP CAM has an input to receive signal IP and an output to provide a signal labeled "IPMATCH." Region CAM 340 has an input to receive signal IPMATCH, an input to receive signal CMA, and an output to provide a signal labeled "REGION MATCH." MACL RAM 330 has an input to receive signal IPMATCH, an input to receive signal CMA, and an output to provide a signal labeled "MACL." History module 340 has an input to receive signal IPMATCH, an input to receive signal REGION MATCH, an input to receive signal MACL, an input to receive signal CMA(9:6), and an output to provide a signal labeled "CONFIDENCE." Fetch control module 350 has an input to receive signal CONFIDENCE, and an output to provide signal FETCH.

IP CAM 310 is configured to provide a record of previous instructions that experienced a cache-miss, and to provide an indication if one of the stored instructions is once again executed. IP CAM 310 is a first-in first-out (FIFO) structure containing sixty-four entries. Each entry can include an instruction pointer, such as represented by signal IP. An instruction pointer is the address of an instruction, and instruction pointers stored at IP CAM are associated with instructions that experienced a data cache-miss. Each of the sixty-four entries that can be stored at IP CAM 310 is unique.

IP CAM 310 receives instruction pointer signal JP that provides the address of the instruction that experienced a cache-miss. If the address provided by signal IP is already stored at IP CAM 310, IP CAM 310 is not modified. If the address provided by signal IP is not already stored at IP CAM 310 and IP CAM 310 is not full, the address corresponding to the instruction is pushed into the bottom of the FIFO structure, effectively pushing each entry one step nearer to the top of the FIFO structure. If the address provided by signal IP is not already stored at IP CAM 310 and IP CAM 310 is full, the least recent entry contained at the top of IP CAM 310 is evicted, and the new entry is pushed on to the bottom of the FIFO structure. IP CAM 310 provides a sixty-four bit one-hot output signal IPMATCH. A one-hot signal refers to a multiple-bit signal wherein at most one bit of the signal can be asserted at a particular time. A single bit of signal IPMATCH is asserted if IP CAM 310 already contains the same IP value. The particular bit of signal IPMATCH that is asserted corresponds to the respective position in the FIFO of the matching IP value stored at IP CAM 310.

Each respective entry at IP CAM 310 has a corresponding entry at region CAM 320, and MACL RAM 330. If an entry is evicted at IP CAM 310, a corresponding entry is also evicted at region CAM 320 and MACL RAM 330. If a region is updated at region CAM 320 in response to a hit at IP CAM 310, a corresponding cache line pointer is also updated at MACL RAM 330. For example, the first entry at MACL RAM 330 contains the cache line location within the region stored at the first entry of region CAM 320, and corresponding to the instruction, whose instruction address is located at the first entry of IP CAM 310, that experienced the cache-miss Region CAM 320 is configured to store a representation of a one-kilobyte region of memory corresponding to each instruction stored at IP CAM 310, and to provide an indication at output signal REGION MATCH if a subsequent CMA is included in any of the regions stored at region CAM 320. Region CAM 320 is a FIFO structure containing sixty-four entries. Each entry can include an address specifying a particular region of memory. A region is a range of memory addresses that includes the CMA associated with a particular instruction pointer. In operation, the corresponding region of all subsequent CMAs are compared to the region associated with a current CMA, and respective bits of the multi-hot output signal REGION MATCH are asserted to indicate each match. When a cache-miss occurs, zero to sixty-four bits of signal REGION MATCH can be asserted. The assertion of a respective bit of signal REGION MATCH indicates that the instruction associated with the corresponding entry at region CAM 320 experienced a cache-miss within the same region containing the current CMA.

Region CAM 320 receives signal CMA from instruction module 110 that provides the address of the data that resulted in a cache-miss at L1 cache memory 120. If region CAM 320 is not full and the current instruction producing the cache-miss is not already stored at IP CAM 310, the corresponding address region is pushed on to the bottom of the FIFO structure of region CAM 320 and associated with the instruction pointer of the current instruction, effectively pushing each entry one step nearer to the top of the FIFO. If region CAM 320 is full, the least recent entry contained at the top of region CAM 320 is evicted, and the new entry is pushed on to the bottom of the FIFO. Region CAM 320 provides a sixty-four bit multi-hot output signal REGION MATCH. Respective bits of signal REGION MATCH are asserted if the current CMA is included within a corresponding region stored at region CAM 320. For example, if the current CMA is included within regions represented at entry zero and entry five of region CAM 320, bits zero and five of signal REGION MATCH are asserted. If the current CMA is a result of executing an instruction that is already contained in IP CAM 310, the existing entry at region CAM 320 representing the old region associated with that instruction is replaced with an entry representing the region associated with the new CMA. Thus, region CAM 320 is updated in response to a subsequent cache-miss of an instruction currently represented at IP CAM 310, or a cache-miss of an instruction that is not previously included at IP CAM 310 or region CAM 320.

MACL RAM 330 is configured to store a representation of where each CMA is located within its respective region, and to provide an indication of that location at output signal MACL if the corresponding instruction is again executed and again experiences a cache-miss. MACL is an acronym for miss-address cache line. Because a one kilobyte region of memory can be represented by sixteen cache lines, the locations stored at MACL RAM 330 may be referred to as one of sixteen corresponding cache lines. A cache line can be represented by four bits of the CMA, CMA(9:6). The particular cache line within a region that contains the CMA is specified using a four-bit pointer. MACL RAM 330 contains sixty-four entries. Each entry can include a four-bit address specifying which cache line of the sixteen cache lines included in a region contained the CMA associated with a previous cache-miss. Each entry corresponds to an entry in IP CAM 310 and region CAM 320.

MACL RAM 330 receives signal CMA(9:6) that provides information indicative of the cache line location within a region that contains the address of the data that resulted in a cache-miss at L1 cache memory 120. If IP CAM 310 is not full and the instruction producing the cache-miss is not already stored at IP CAM 310, the cache line pointer is stored at MACL RAM 330 at a location specified by the instruction pointer of the instruction that produced the cache-miss. If IP CAM 310 is full and does not already have an entry corresponding to the current instruction producing the cache-miss, the least recent entry at MACL RAM 330 is replaced with the cache line pointer associated with the current instruction. If the current CMA is a result of executing an instruction that is already contained in IP CAM 310, the entry at MACL RAM 330 corresponding to that instruction is updated with a new cache line location associated with the location of the current CMA within a region. MACL RAM 330 provides a four-bit binary output signal MACL.

History module 340 is configured to accumulate location information relating to cache-miss addresses, and provide ongoing analysis of the location information via activities at IP CAM 310, region CAM 320, and MACL RAM 330 to determine which addresses are likely candidates for prefetching. History module 340 communicates this determination to fetch control module 350 via signal CONFIDENCE. The operation of history module 340 is described in detail with reference to FIG. 4. Fetch control module 350 receives signal CONFIDENCE and initiates access at L2 cache memory 130 to speculatively procure data in anticipation that the data will be subsequently required.

Figure 4:
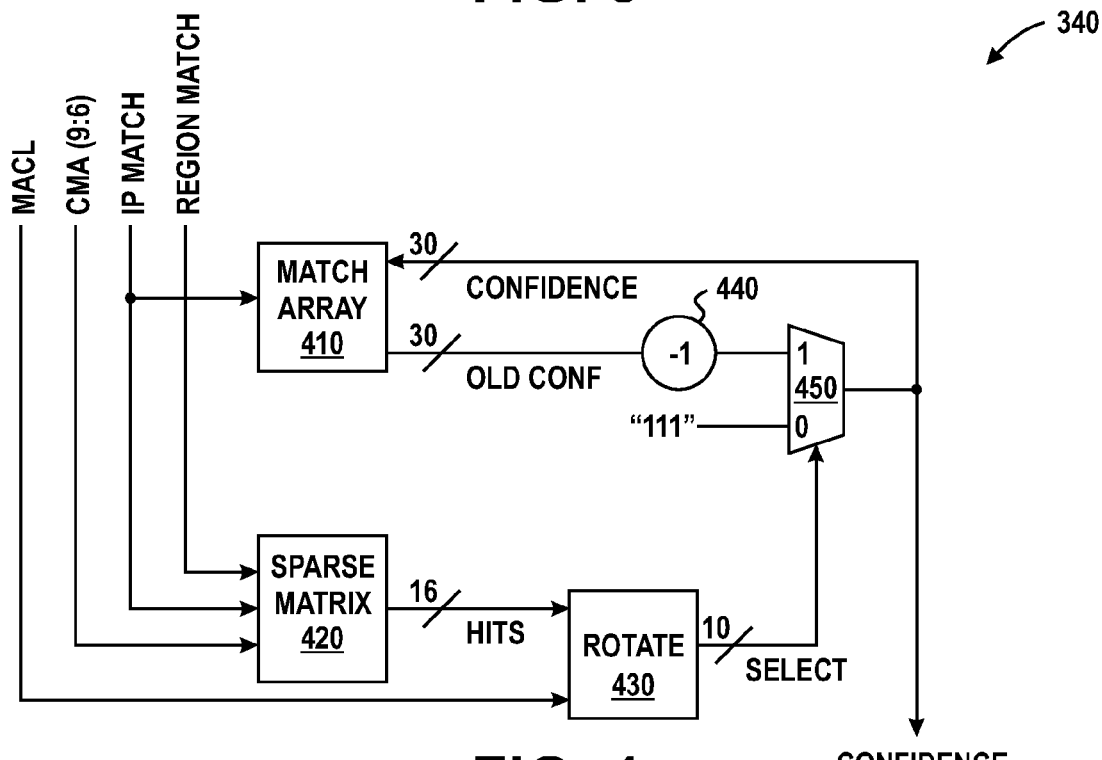
FIG. 4 is a block diagram illustrating the history module of FIG. 3 in accordance with a specific embodiment of the present disclosure.

FIG. 4 is a block diagram illustrating the history module 340 of FIG. 3 in accordance with a specific embodiment of the present disclosure. History module 340 includes a match array 410, a sparse matrix 420, a rotate module 430, a decrement module 440, and a multiplexor module 450. Match array 410 has an address input to receive signal IP MATCH, a data input to receive signal CONFIDENCE, and an output to provide a signal labeled "OLD CONF." Sparse matrix 420 has an input to receive signal REGION MATCH, an input to receive signal IP MATCH, an input to receive signal CMA(9:6), and an output to provide a signal labeled "HITS." Rotate module 430 has an input to receive signal MACL, an input to receive signal HITS, and an output to provide signal SELECT. Decrement module 440 has an input to receive signal OLD CONF, and an output. Multiplexor module 450 has an input connected to the output of decrement module 440, an input to receive a binary data value equal to 111, and an output to provide signal CONFIDENCE.

Match array 410 and sparse matrix 420 operate together to provide a historical record indicative of which offsets from a stored CMA had cache-misses and how recently each of those cache-misses occurred, for each instruction represented at IP CAM 310. Sparse matrix accumulates and maintains a running record of offset information and this information is updated at match array 410 in response to a hit at IP CAM 310 as indicated by an assertion of one of the sixty-four bits of signal IP MATCH. A hit at IP CAM 310 occurs when the current CMA is a result of executing an instruction that previously experienced a cache-miss and the instruction address of that instruction is still represented by an entry at IP CAM 310.

Match array 410 is a FIFO structure including sixty-four rows and thirty columns. The sixty-four rows correspond to the sixty-four entries of IP CAM, and are individually selected by signal IP MATCH. Each entry includes thirty bits, which represents ten three-bit confidence factors. The selected thirty-bit entry at match array 410 is accessed during a first phase of a cycle in response to signal IP MATCH, and an updated thirty-bit value is written back to the same location in the following phase of that cycle. The thirty-bit data value represents ten three-bit confidence factors, and each confidence factor represents a particular offset from the cache line location information stored at MACL RAM 330. Each thirty-bit data value corresponds to a respective instruction stored at IP CAM 310.

A greater or fewer number of three-bit offset values can be maintained at match array 410 to represent offsets that are further or closer removed, respectively, from the CMA associated with a particular instruction represented at IP CAM 310 and cache line entry at MACL RAM 330. In the particular embodiment illustrated, the ten confidence values correspond to offsets ranging from four cache lines below an instruction CMA to six cache lines above the instruction CMA. Note that the cache line containing the CMA associated with each instruction is not included at match array 410. For example, a value of six at the first entry of MACL RAM 330 indicates that the CMA associated with the first instruction represented at IP CAM 310 is included within cache line location six of the region represented at the first location of region CAM 320. The first entry at match array 410 thus includes information relating to previous cache-misses where the CMAs associated with each cache-miss are included within that region. Furthermore, the information provides an indication of cache-misses that occurred at cache line locations ranging from cache line location two (six minus four), up to cache line location twelve (six plus six).

The value of a three-bit confidence factor can vary from zero to seven, where seven indicates that a cache-miss occurred at the corresponding offset during the interval of time between the last two previous hits at IP CAM 310. For example, if any instruction produces a cache-miss and the location of the CMA is within an offset represented by a confidence factor included at match array 410 for an instruction stored at IP CAM 310, the particular value of the confidence factor corresponding to that offset is set to binary 111 (decimal seven) the next time the IP CAM 310 indicates a hit on that stored instruction. When the thirty-bit entry at match array 410 is updated due to a hit at IP CAM 310, offset values that are not set to binary 111 are decremented. The selection of which entries at match array 410 are set is determined by sparse matrix 420.

Sparse matrix 420 is a FIFO structure that includes 64 rows and sixteen columns. Sparse matrix can store a one-bit data value at a bit cell addressed by one row and one column. Sparse matrix 420 is configured to accumulate information about successive cache-misses that resulted in hits at region CAM 320, and specifically which cache line contained the CMA for each of the respective hits. During a write operation, bit cells associated with a particular column can be set. The particular column to be written is selected by a decode of CMA(9:6). Thus, each column of sparse matrix 420 corresponds to one of sixteen cache lines within a one-kilobyte address region. One or more bit cells of a single column at sparse matrix 420 is set to a binary one, the bit cell selected by the assertion of a corresponding bit of signal REGION MATCH.

For example, if the current instruction experienced a cache-miss and the current CMA is located within the region corresponding to five previous instructions that also experienced cache-misses and which are represented at IP CAM 310 and region CAM 320, five bits of signal REGION MATCH corresponding to each of the region-matching instructions will be asserted. The current cache-miss address indicated by signal CMA(9:6) is decoded to select a single column. Therefore, five bit cells at sparse matrix 420 are set corresponding to the five rows selected by signal REGION MATCH and a column selected by CMA(9:6). Each assertion of a bit of signal REGION MATCH causes a single bit at sparse matrix 420 to be set. Entries at sparse matrix 420 are written (set) as described in response to any corresponding assertion of a bit of signal REGION MATCH, except when that entry is also associated with a bit of signal IP MATCH when that bit is also asserted.

Sparse matrix 420 is accessed one row at a time, and the particular row is selected by the assertion of a corresponding bit of signal IP MATCH. Sixteen bit cells are read corresponding to each of the sixteen columns. Furthermore, all bit cells of the selected row are cleared immediately after being accessed. Note that the clear operation takes precedence over any write operation that is scheduled to occur in the same cycle as the read operation. The sixteen bits that are accessed during a read operation indicates accumulated cache-misses that have occurred since the last time that particular instruction was executed and resulted in a cache-miss. Specifically, the sixteen bits indicates which cache lines within a one-kilobyte address region, contained the CMA for each of the cache-misses. The sixteen-bit value accessed at sparse matrix 420 is provided at output signal HITS.

Rotate module 430 receives the signal HITS from sparse matrix 420 determines which entries at match array 410 are set to a value of 111 and which entries are decremented. Table 1 illustrates how the value of signal SELECT is determined based on the value of signal HITS and the value of signal MACL.

TABLE 1

| | SELECT(9:0) | | | | | | | | | |
|---|---|---|---|---|---|---|---|---|---|---|
| MACL = 0 | 15 | 14 | 13 | 12 | 1 | 2 | 3 | 4 | 5 | 6 |
| MACL = 1 | 0 | 15 | 14 | 13 | 2 | 3 | 4 | 5 | 6 | 7 |
| MACL = 2 | 1 | 0 | 15 | 14 | 3 | 4 | 5 | 6 | 7 | 1'b0 |
| MACL = 3 | 2 | 1 | 0 | 15 | 4 | 5 | 6 | 7 | 1'b0 | 1'b0 |
| MACL = 4 | 3 | 2 | 1 | 0 | 5 | 6 | 7 | 8 | 9 | 10 |
| MACL = 5 | 4 | 3 | 2 | 1 | 6 | 7 | 8 | 9 | 10 | 11 |
| MACL-6 | 5 | 4 | 3 | 2 | 7 | 8 | 0 | 10 | 11 | 12 |
| MACL-7 | 6 | 5 | 4 | 3 | 8 | 9 | 10 | 11 | 12 | 13 |
| MACL = 8 | 7 | 6 | 5 | 4 | 8 | 10 | 11 | 12 | 13 | 14 |
| MACL = 9 | 8 | 7 | 6 | 5 | 10 | 11 | 12 | 13 | 14 | 15 |

TABLE 1-continued

| | SELECT(9:0) | | | | | | | | | |
|---|---|---|---|---|---|---|---|---|---|---|
| MACL = 10 | 9 | 8 | 7 | 6 | 11 | 12 | 13 | 14 | 15 | 1'b0 |
| MACL = 11 | 10 | 9 | 8 | 7 | 12 | 13 | 14 | 15 | 1'b0 | 1'b0 |
| MACL = 12 | 11 | 10 | 9 | 8 | 13 | 14 | 15 | 0 | 1 | 2 |
| MACL = 13 | 12 | 11 | 10 | 9 | 14 | 15 | 0 | 1 | 2 | 3 |
| MACL = 14 | 13 | 12 | 11 | 10 | 15 | 0 | 1 | 2 | 3 | 4 |
| MACL = 15 | 14 | 13 | 12 | 11 | 0 | 1 | 2 | 3 | 4 | 5 |

The value in each cell of TABLE 1 indicates which bit of signal HITS is associated with each bit of signal SELECT. For example, if the value of signal MACL is equal to zero, the value of signal SELECT(9) is set to the same value as signal HIT(15), and the value of signal SELECT(8) is set to the same value as signal HIT(14). Thus, if the value of signal HIT(15) is a one, the value of signal SELECT(9) is set to a one, and if the value of signal HIT(15) is a zero, the value of signal SELECT(9) is set to a zero. Each bit of signal HITS can be a zero or a one, and a value of one indicates that a cache-miss occurred at the associated cache-line within a one-kilobyte region of memory since the last time that the current instruction was executed and resulted in a cache-miss. Because the hybrid regions implemented by region CAM 320 only approximate floating regions, particular cache lines represented at sparse matrix 420 may not correspond to a corresponding offset represented at match array 410. For such a circumstance, rotate module 430 sets a corresponding bit of SELECT(9:0) to a zero. This is indicated by the value 1'b0 indicated at TABLE 1.

Thus, rotate module 430 translates the information provided by signal HITS from an absolute cache line address into an offset that indicates the location of cache-misses relative to the cache line corresponding to the CMA of the particular instruction that hit at IP CAM 310. For example, an entry at sparse matrix 420 may indicate that a cache-miss occurred at cache line zero within the region associated with the first instruction stored at IP CAM 310. Signal HIT(0) corresponds to cache-line zero. If the same instruction experiences another cache-miss, confidence factors at match array 410 are updated to reflect which cache lines within the region associated with that instruction correspond to other cache-miss addresses that have occurred within the same region since the last time that that instruction was executed and resulted in a cache-miss. For example, if the value of signal HITS(0) is a one, this indicates that a cache-miss has occurred corresponding to cache-line zero of the associated region stored at region CAM 320 corresponding to the current instruction.

Confidence factors stored at match array 410 are stored in an arbitrary order, determined by rotate module 430 and illustrated at TABLE 1. Rotate module 430 provides a ten-bit signal SELECT where each bit corresponds to one of the ten three-bit confidence factors stored at match array 410. Each respective bit of signal SELECT is applied to a corresponding selection input of one of ten multiplexors at multiplexor module 450.

Decrement module 440 includes ten three-bit subtraction modules. Each of the ten three-bit confidence factors read from match array 410 is speculatively decremented and each respective result is supplied to a corresponding multiplexor at multiplexor module 450.

Multiplexor module 450 is configured to provide updated confidence values that are written back to match array 410 at the same location that was previously accessed. Each of the ten updated confidence values is either decremented or set to binary 111 based on the value of a corresponding bit of signal SELECT. If the respective bit of signal SELECT is a one, the associated multiplexor is configured to set the corresponding updated confidence value to binary 111. If the respective bit of signal SELECT is a zero, the associated multiplexor is configured to set the corresponding updated confidence value to be equal to the old confidence value decremented by one.

Thirty-bit signal CONFIDENCE thus represents ten three-bit confidence factors and furthermore provides an indication of which offsets from the current CMA were associated with a cache-miss and an indication of how recently the hit to each offset occurred. For example, a confidence value of binary 111 indicates that the corresponding offset was associated with a cache-miss between the last two times that the associated instruction experienced a cache-miss. A confidence value of less than binary 111 indicates that the particular offset was associated with a previous cache-miss, but that the cache-miss to that offset occurred less recently. A lower confidence value corresponds to a less recent cache-miss at that offset. The updated confidence value is provided to fetch control module 350, which can use the information to determine addresses that should be prefetched. For example, particular offsets from the current CMA may be good candidates for prefetching if the confidence values associated with those offsets are at or close to a value of binary 111. Conversely, if the confidence value associated with a particular offset is low or zero, this offset may not be a good candidate to be prefetched. Prefetch module 150 is configured to determine which offsets should be prefetched based on the confidence values.

Figure 5:
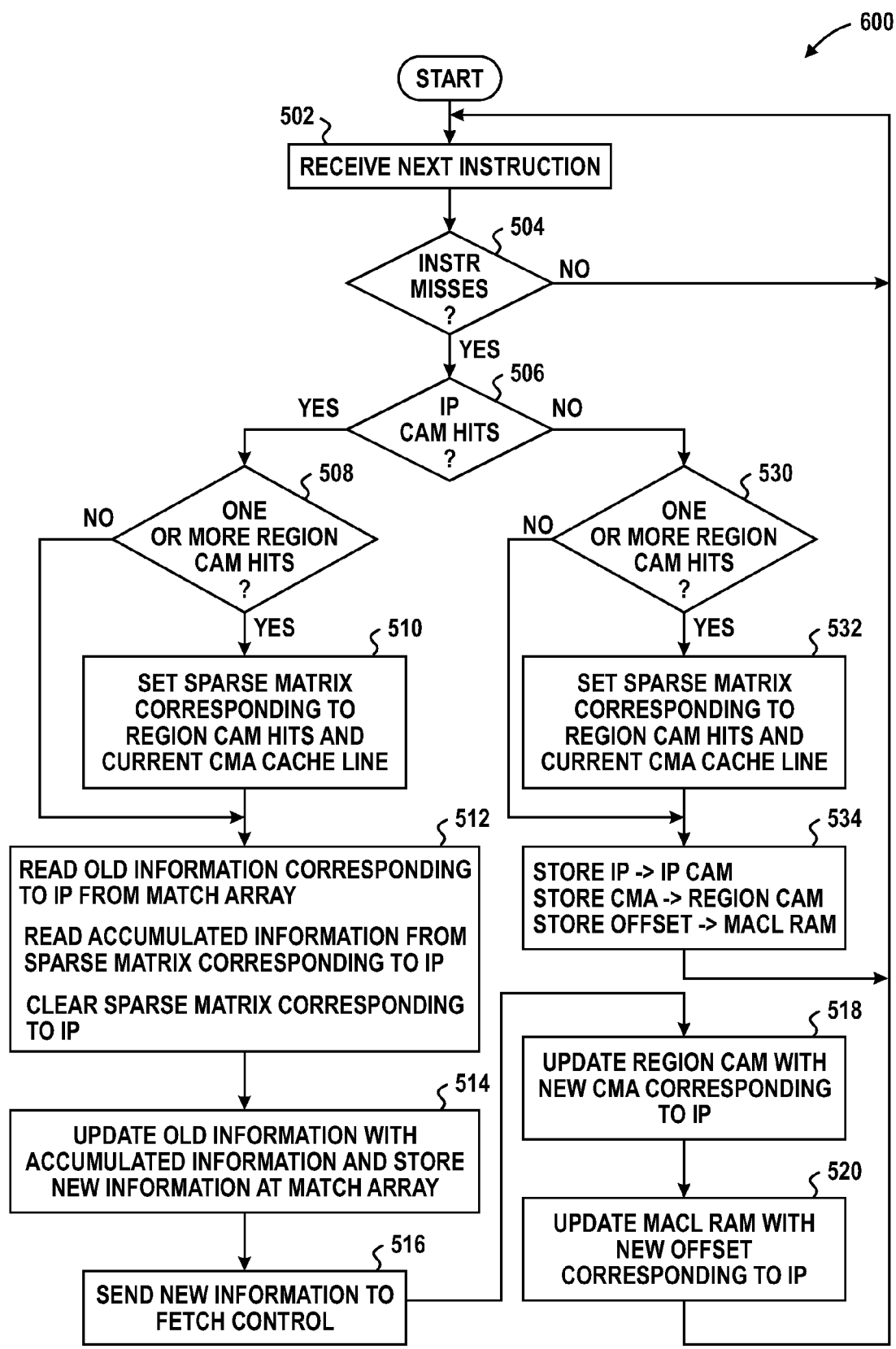
FIG. 5 is a flow diagram illustrating a method in accordance with a specific embodiment of the present disclosure.

FIG. 5 is a flow diagram illustrating a method 500 in accordance with a specific embodiment of the present disclosure. At block 502, an instruction is received at instruction module 110. The instruction is a data-manipulation instruction and an attempt to fetch the required data from L1 cache memory 120 is initiated. At decision block 504, a determination is made as to whether the fetch was successful. If the fetch resulted in a cache-miss, the flow proceeds to decision block 506. If the fetch was successful, the flow returns to block 502 where another instruction can be received. Decision block 506 determines whether the instruction at instruction module 110 previously produced a cache-miss, indicated by a hit at IP CAM 310. If IP CAM 310 indicates that the instruction previous produced a cache-miss, the flow proceeds to decision block 508. If IP CAM 310 indicates that the instruction is not represented at IP CAM 310, the flow proceeds to decision block 530.

At decision block 508, region CAM 320 determines whether one or more previous CMAs are located within the same region corresponding to the current CMA. If one or more entries at region CAM 320 indicate a hit, the flow proceeds to block 510, otherwise the flow proceeds to block 512. At block 510, respective bits of sparse matrix are set corresponding to bits of signal REGION MATCH that are asserted and also corresponding to the cache line of the current CMA. The flow proceeds to block 512 where confidence values associated with the current instruction are updated. The old confidence values are read from match array 410. The new confidence values are determined by hits to region CAM 320 that has been accumulated at sparse matrix 420. The information at sparse matrix is now reflected at match array 410 so the corresponding row at sparse matrix 420 should be cleared. At block 514, new confidence values are written back to the same row at match array 410.

At block 516, the new confidence values are provided to fetch control module 350, which may perform a prefetch operation based on the information. In an embodiment of the present disclosure, a threshold can be established wherein a confidence factor below a particular value is ignored. At block 518, the entry at region CAM 320 corresponding to the current instruction is updated to include an indication of the region containing the current CMA. At block 520, the entry at MACL RAM 330 corresponding to the current instruction is updated to include the cache line corresponding of the current CMA. The flow returns to block 502 where the next instruction is received at instruction module 110.

At decision block 530, region CAM 320 determines whether one or more previous CMAs are located within the same region corresponding to the current CMA. If one or more entries at region CAM 320 indicate a hit, the flow proceeds to block 532, otherwise the flow proceeds to block 534. At block 532, respective bits of sparse matrix are set corresponding to bits of signal REGION MATCH that are asserted and also corresponding to the cache line of the current CMA. At block 534, the new entries corresponding to the current instruction are written to each of IP CAM 310, region CAM 320, and MACL RAM 330, evicting the oldest prior entry if full. The instruction pointer associated with the current instruction is stored at IP CAM 310, the current CMA is stored at region CAM 320, and the offset of the current CMA is stored at MACL CAM 330. The flow returns to block 502 where the next instruction is received at instruction module 110.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, a prefetch module 150 is described herein that determines preferred addresses to speculatively prefetch based on heuristics including address regions and particular offsets between CMAs. In another embodiment, prefetch module 150 can utilize additional heuristics such as stride to determine preferred addresses to prefetch. For example, MACL RAM 330 can store additional bits of each CMA that can be used to provide stride-based predictions. Match array 410 can store, and fetch module 350 can utilize, a different number offsets and each offset can be represented by a different number of bits. Whereas three-bit confidence values are described, a greater or lesser number of bits can be selected to represent a relative weight assigned to each offset parameter. The particular embodiment illustrated includes a match array that maintains a record of ten offsets for each instruction, but a greater or fewer number of offsets can be monitored.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
in response to a cache miss based on a first address:
selecting a first plurality of memory locations of a first memory based on a cache line associated with the first address;
selecting a subset of the plurality of memory locations based on first region information delineating a cache region associated with the first address, the cache region comprising a plurality of cache lines, wherein selecting the subset selects fewer than all of the plurality of memory locations;
storing values at the selected subset of the plurality of memory locations; and
fetching an instruction based on the values stored at the subset of the plurality of memory locations, wherein fetching an instruction comprises modifying a plurality of confidence values stored a second memory, each of the plurality of confidence values associated with an address of a third memory, wherein modifying the confidence values comprises selecting the plurality of confidence values based on the values stored at subset of the plurality of memory locations by rotating based on second region information indicating a location of the cache line in the cache region the values stored at the first memory to determine a rotated value and selecting the plurality of confidence values based on the rotated; and
clearing the first memory of the values stored at the subset of the plurality of memory locations in response to rotating the values.

2. The method of claim 1, wherein fetching the instruction comprises prefetching the instruction.

3. A device, comprising:
a cache;
a memory;
a control module to:
in response to a cache miss based on a first address:
select a first plurality of memory locations of the memory based on a cache line associated with the first address;
select a subset of the plurality of memory locations based on first region information delineating a cache region associated with the first address, the cache region comprising a plurality of cache lines, wherein selecting the subset selects fewer than all of the plurality of memory locations;
store values at the selected subset of the plurality of memory locations; and
fetch an instruction based on the values stored at the subset of the plurality of memory locations by modifying a plurality of confidence values stored at a second memory, each of the plurality of confidence values associated with an address of a third memory, wherein modifying the confidence values comprises selecting the plurality of confidence values based on the values stored at subset of the plurality of memory locations by rotating based on second region information indicating a location of the cache line in the cache region the values stored at the first memory to determine a rotated value and selecting the plurality of confidence values based on the rotated value; and
clear the memory of the values stored at the subset of the plurality of memory locations in response to rotating the values.

4. A non-transitory computer readable medium tangibly embodying a set of executable instructions, the set of executable instructions to manipulate at least one processor to:
in response to a cache miss based on a first address:

select a first plurality of memory locations of a first memory based on a cache line associated with the first address;

select a subset of the plurality of memory locations based on first region information delineating a cache region associated with the first address, the cache region comprising a plurality of cache lines, wherein selecting the subset selects fewer than all of the plurality of memory locations;

store values at the selected subset of the plurality of memory locations; and fetch an instruction based on the values stored at the subset of the plurality of memory locations by modifying a plurality of confidence values stored at a second memory, each of the plurality of confidence values associated with an address of a third memory, wherein modifying the confidence values comprises selecting the plurality of confidence values based on the values stored at subset of the plurality of memory locations by rotating based on second region information indicating a location of the cache line in the cache region the values stored at the first memory to determine a rotated value and selecting the plurality of confidence values based on the rotated value; and clear the first memory of the values stored at the subset of the plurality of memory locations in response to rotating the values.

* * * * *

UNITED STATES PATENT AND TRADEMARK OFFICE
CERTIFICATE OF CORRECTION

PATENT NO. : 8,677,049 B2  
APPLICATION NO. : 12/422467  
DATED : March 18, 2014  
INVENTOR(S) : Mahadev S. Deshpande et al.

It is certified that error appears in the above-identified patent and that said Letters Patent is hereby corrected as shown below:

In the Claims

Claim 1, Column 12, Line 13, please change "wherein fetching an instruction comprises modifying a plurality of confidence values stored a second memory" to --wherein fetching an instruction comprises modifying a plurality of confidence values stored at a second memory--

Claim 1, Column 12, Line 24, please change "based on the rotated; and" to --based on the rotated value; and--

Signed and Sealed this  
Second Day of September, 2014

Michelle K. Lee  
*Deputy Director of the United States Patent and Trademark Office*